United States Patent [19]

Daniels

[11] 3,717,059
[45] Feb. 20, 1973

[54] IRONWORKER
[75] Inventor: Dennis Daniels, Williamsville, N.Y.
[73] Assignee: U.S. Amada Ltd., Seattle, Wash.
[22] Filed: March 18, 1971
[21] Appl. No.: 116,123

[52] U.S. Cl. ..................83/401, 83/552, 83/522, 83/648
[51] Int. Cl. ..........B26d 7/16, B26d 5/02, B26d 5/12
[58] Field of Search........83/552, 252, 522, 531, 401, 83/648

[56] References Cited
UNITED STATES PATENTS 3,293,971    12/1966    Kuss....................................83/522 X
3,139,779    7/1964     Bredow..............................83/552 X
2,701,017    2/1955     Wiedemann.......................83/552 X Primary Examiner—Gil Weidenfeld
Attorney—Seed, Berry & Dowrey

[57] ABSTRACT

A plurality of unitized tools are positioned on a rotatable turret for moving the tools to a fixed punching station. Workpiece positioning means are provided and include a plurality of rollers for supporting the workpiece and means for moving the rollers to locate the workpiece in the Y axis. A gaging system is provided for locating the workpiece in the X axis and includes a sliding end gage actuated by the workpiece.

9 Claims, 6 Drawing Figures

INVENTOR
DENNIS DANIELS

ATTORNEYS

INVENTOR
DENNIS DANIELS

BY

ATTORNEYS

PATENTED FEB 20 1973  3,717,059
SHEET 3 OF 3
FIG. 4
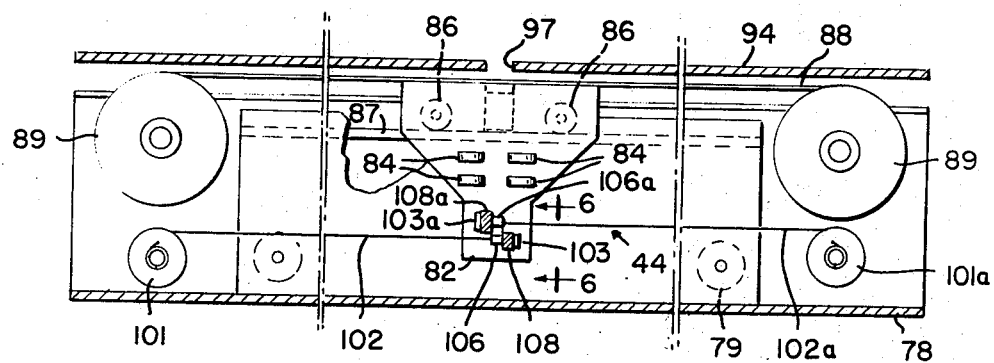
FIG. 5
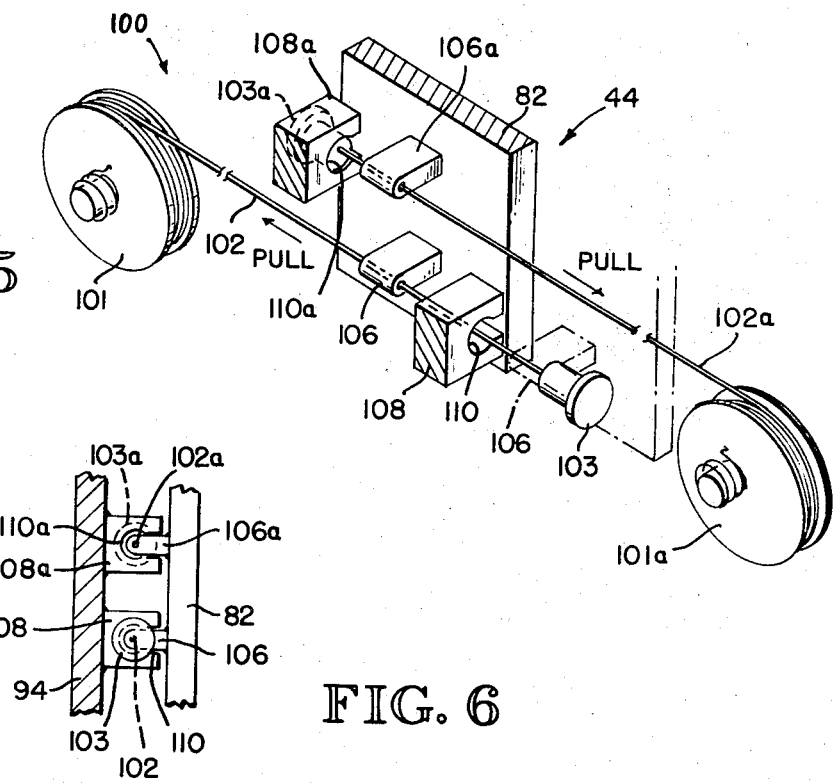
FIG. 6
INVENTOR.
DENNIS DANIELS

IRONWORKER

BACKGROUND OF THE INVENTION

1. Field of the Invention

This invention relates to the class of punching apparatus known in the art as "ironworkers."

2. Description of the Prior Art

Ironworkers are machines for performing punching, notching, shearing and cut-off operations on structural members which generally have extreme lengths and varied forms and shapes. Heretofore, ironworkers had multiple tooling locations spread about the machine body in such positions as to suit power transmission from a single-crank and did not permit the incorporation of efficient gaging. Furthermore, prior art ironworkers generally employed separate punch and dies at each tooling location requiring time-consuming delays for replacement.

SUMMARY OF THE INVENTION

It is an object of this invention to provide an efficient and versatile ironworker.

It is another object of this invention to provide an ironworker having unitized tooling readily positionable at a fixed punching station.

It is another object of this invention to provide an efficient and accurate gaging system for a turret ironworker.

It is another object of this invention to provide a workpiece positioning mechanism and gaging system for quickly and accurately locating the workpiece at a punching station in both the Y and X axes.

Basically, these objects are accomplished by providing an ironworker with a fixed punching station and a rotatable turret having unitized tooling. The turret is rotated for positioning the unitized tooling selectively at the punching station.

The means for positioning the workpiece at the punching station includes workpiece-supporting means movable in a first axis. The gaging system for locating the workpiece along the other axis comprises a movable tape actuated by movement of the workpiece in a second axis and self-returning to the zero position when the workpiece is removed.

BRIEF DESCRIPTION OF THE FIGURES OF THE DRAWINGS

FIG. 4 is a vertical section taken along the line 4—4 of FIG. 3;

FIG. 5 is a schematic isometric of a portion of the gaging system shown in FIG. 4;

FIG. 6 is a fragmentary section of a portion of the gaging system.

DESCRIPTION OF THE PREFERRED EMBODIMENTS

Figure 1:
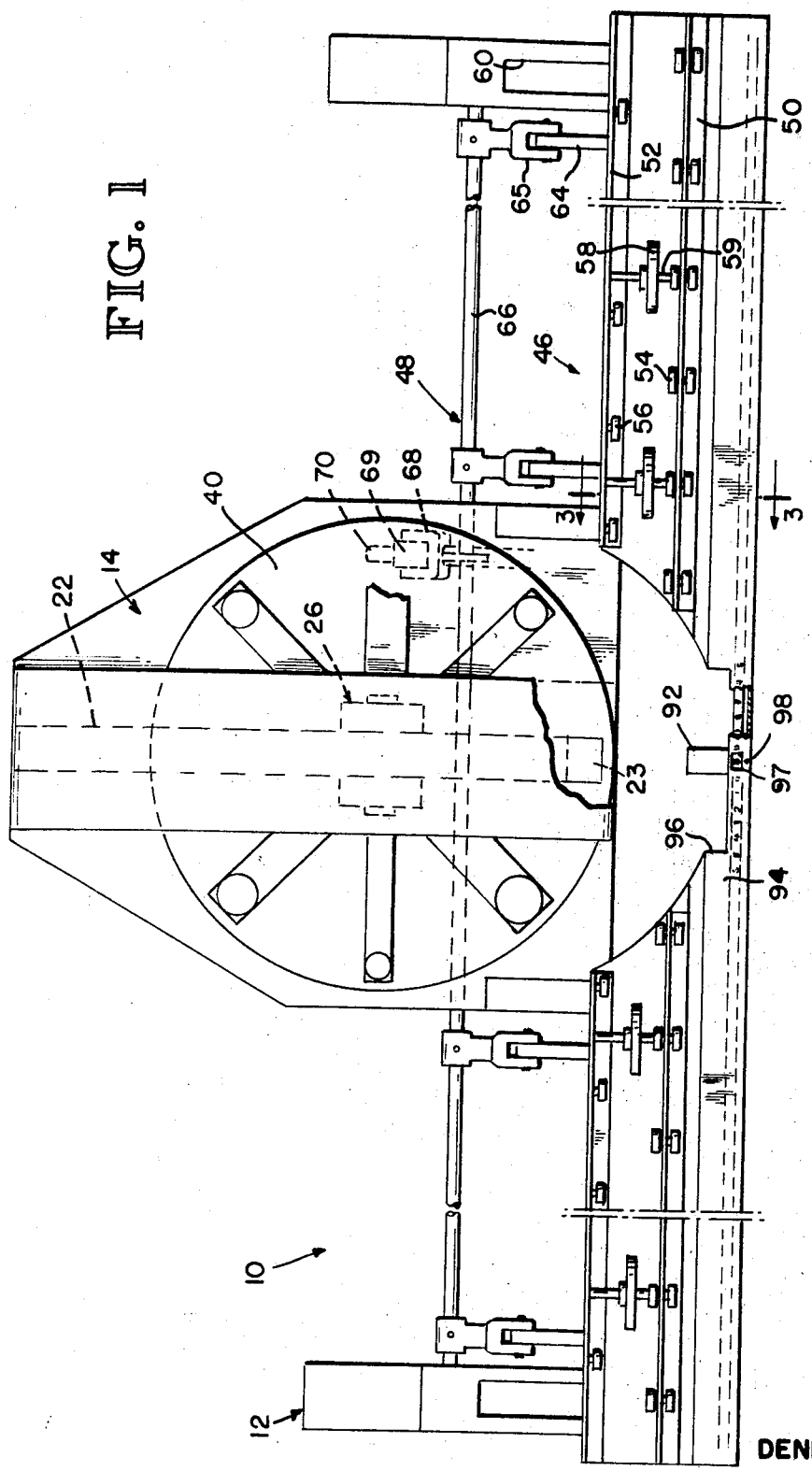
FIG. 1 is a plan view of an ironworker embodying the principles of the invention.
Figure 2:
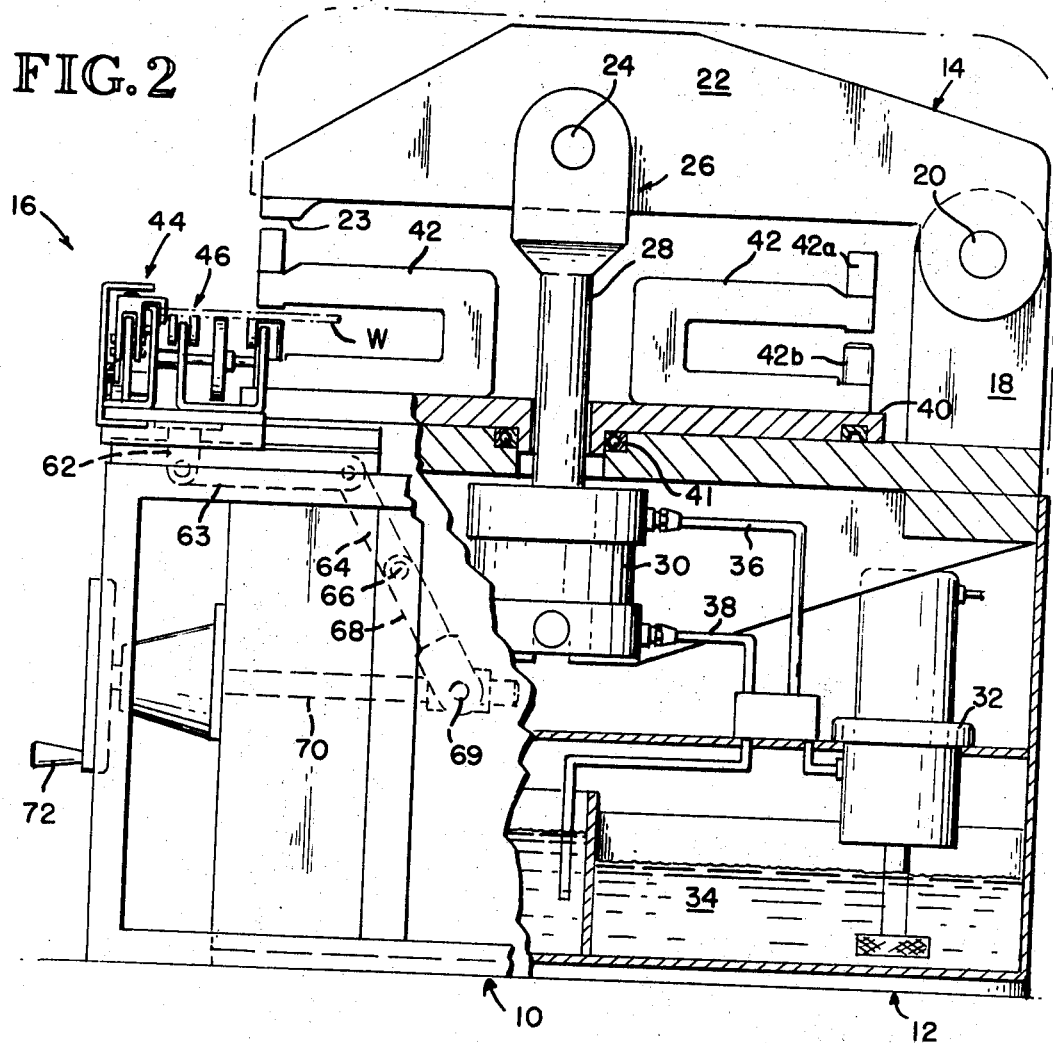
FIG. 2 is an end elevation with parts broken away for clarity of the ironworker shown in FIG. 1.

As best shown in FIG. 1, the ironworker of this invention includes a frame 10 having a lower section 12, an upper section 14, and a workpiece positioning section 16. The upper section 14 includes a pivot post 18 housing a pivot 20 for pivotally mounting a ram support arm 22. The ram support arm is provided with a striker 23 at its free end. At the approximate midpoint of the ram support arm, a pin 24 is provided which is coupled to a ram actuating mechanism 26.

The ram actuating mechanism 26 includes a piston rod 28 coupled to the pin 24 and a conventional hydraulic cylinder 30. an electrically driven pump 32 supplies hydraulic fluid from a reservoir 34 to an intake line 36 on the cylinder. An outlet line 38 connects the opposite end of the cylinder 30 to the reservoir 34. The details of the hydraulic system are well known to those skilled in the art and are not required in this description for an understanding of the invention.

The upper section 14 is provided with a rotatably mounted turret 40 which rotates in a bearing 41. The turret can be rotated by suitable power means (not shown) or by hand. The turret is provided with a plurality of circumferentially spaced unitized tools 42 which, by rotating the turret, may be positioned beneath the striker 23. The term unitized tool is designated to mean an integral unit which houses both the punch 42a and the die 42b the punch and die may be of any conventional type well known in the ironworker art and specifically include tools suitable for punching, notching, shearing or like operations. The punch and die are aligned accurately during their manufacture and installation into the unitized unit. Thus, to change one of the operations of the ironworker, it is only necessary to replace an entire unitized unit 42 and automatically obtain accurate alignment of a punch and die at the exact desired location beneath the striker 23. The unitized tool has a further important advantageous relationship with the gaging system and workpiece positioning mechanism 16 since the unitized tooling can at the time of manufacture be machined such that the location of the punch and die on the replacement tooling is exactly the same as on the replaced tooling. In this manner each punch and die will have the same relative location with reference to the workpiece positioning mechanism 16 and gaging system so that these locating mechanisms will not need corrective adjustment.

As is thus far described, it can be readily seen that a workpiece W can be positioned within the desired unitized tooling 42 at the punching station beneath the striker 23. It is important, of course, to position the workpiece W accurately and quickly between the punch and die of the tooling. For this purpose, the workpiece positioning mechanism 16 employs a supporting means 46 for freely supporting the workpiece and positioning means 48 for moving the workpiece supporting means and thus locating the workpiece in a first axis, for the purpose of this description, the Y axis. A gaging system 44 is provided for locating the workpiece in a second axis, for the purpose of this description, the X axis.

Figure 3:
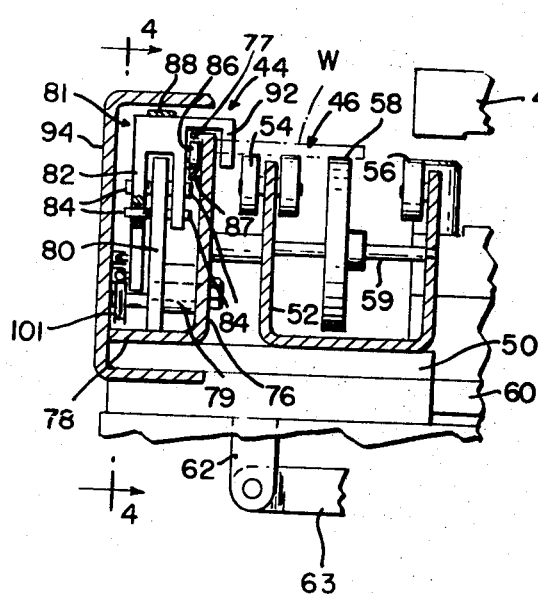
FIG. 3 is a fragmentary vertical section taken along line 3—3 of FIG. 1.

The workpiece supporting means 46 includes an elongated base plate 50 mounting a U-shaped frame 52. The U-shaped frame rotatably supports a plurality of longitudinally and laterally spaced end rollers 54 and 56 and a plurality of center rollers 58, the latter being rotatably and adjustably mounted on shafts 59. As is readily apparent, the workpiece will rest on the various rollers with the adjustable rollers 58 being moved to support workpieces of various widths. For example, the rollers 58 would be moved to the left as viewed in FIG. 3 to support narrow elongated channels or the like.

The positioning means 48 for moving the workpiece supporting means 46 in the Y-axis will now be described. The base plate 50 slides in guideways 60 formed in the lower section 12 of the frame 10. A plurality of spaced posts 62 depend downwardly from the base plate 50 and are pivotally connected to links 63. The links 63 are pivotally coupled at their rear ends to links 64 which, in turn, are pivotally coupled to yokes 65. The yokes 65 are keyed to an elongated shaft 66. The elongated shaft 66 is also keyed to a drive yoke 68. The free end of the drive yoke 68 is pivotally coupled to a nut 69 which is threaded on an axle 70. The axle 70 is rotatably mounted in the lower section 12 of the frame 10 and is rotated by a conventional crank 72. As is thus apparent, rotation of the crank 72 will move the yoke 69 along the axle, thus rotating the elongated shaft 66. Rotation of the shaft 66 will simultaneously rotate the yokes 65 to slide the baseplate 50 along guideway 60.

The gaging system 44 includes an upright bar 76 having an upper horizontal flange 77 and a lower horizontal flange 78. The upper right-hand surface, as viewed in FIG. 3, of the upright bar 76, is smoothly machined to act as a front gaging surface against which the workpiece is abutted for aligning the workpiece in the Y axis. An upright bar 80 is rigidly secured to the upright bar 76 by spacers and bolts 79. A sliding end gage 81 is slidably supported by the bars 76 and 80. For this purpose, the sliding end gage is provided with two downwardly depending legs 82 which are provided with rollers 84 mounted for rotation about vertical axes and abutting the opposite faces of the bar 80. Thus the rollers 84 prevent movement of the sliding end gage relative to the bar along the Y axis, but allow free movement along the X axis. A pair of roller 86 are rotatably mounted on the sliding end gage for rotation about horizontal axes. The rollers 86 ride between the upper horizontal flange 77 on the bar 76 and a horizontal flange 87 secured to the bar 76 below the flange 77. Thus the rollers 86 support the sliding end gage against vertical movement.

A finger 92 is provided on the sliding end gage 81 and extends downwardly into the path of the workpiece W. Thus, movement of the workpiece along the bar 76 will move the sliding end gage. The sliding end gage 81 has secured to its upper surface a pair of elongaged measuring tapes 88, each having suitable graduations starting at a mark on the tapes common to each tape and equidistantly spaced from the zero graduations on each tape. It is to be understood that the spacing between the zero graduation is equal to the width of the finger 92. That is, the gaging faces of the finger engaged by the end of the workpiece are aligned with the respective zero graduations on the two tapes so that measurements begin at the zero graduation. The tapes extend along the length of the workpiece supporting mechanism 44 and are housed in automatically retractable tape-holding mechanisms 89, the details of which are well known in the art. Each tape mechanism 89 will retract the tape 88 as the sliding end gage is moved toward that particular tape mechanism.

A housing 94 is secured to the baseplate 50 and extends up and over the sliding end gage 81. The housing 94 is provided with a cut-out portion 96 for observing the workpiece W and a window 97 to frame the graduations adjacent a fixed pointed 98 that is aligned with the striker 43.

A typical workpiece to be punched can be very long, for example over 20 feet in length. It is therefore desirable that the sliding end gage be returned automatically to reposition the zero graduation at the fixed pointer 98 so that the workman need not be delayed in positioning the next workpiece. For this purpose, a biasing mechanism 100 is provided and includes a pair of vertically spaced reels 101 and 101a each having a wire or strong cord 102, 102a, respectively, wrapped therearound. Conventional spiral springs provide a biasing force of about 20 pounds to return the cord on the spools in a well known manner. The cords are provided at their ends with buttons 103 and 103a secured thereto by a set screws or other suitable means.

The leg 82 of the sliding end gage 81 closest to the housing 94 is provided with a lateral extension 105 having spaced posts 106 and 106a each provided with a cord aperture which loosely receives the respective cords 102 and 102a. Rigidly secured to the housing 94 on either side of the fixed pointer 98 and thus on either side of the lateral extension 105 when the sliding end gage is centered are vertically spaced brackets 108 and 108a. The brackets include keyways 110 and 110a through which the respective posts can readily pass but which blocks passage of the buttons 103 or 103a. As is readily apparent movement of the sliding end gage to the left as shown in FIG. 5 will move the post 106a through the keyway 110a and against the button 103a. Further movement will pull the cord 102a off the reel 101a against the biasing force of the spiral springs. When the sliding end gage is released, the cord will be returned pulling the post 106a until the button 103a again nests in the keyway 110a. Movement to the right will bring the post 106 against button 103 to apply a spring force by the reel 101, but the post 106a will freely slide along the cord 102a. As is apparent from the drawings the brackets 108 and 108a can be positioned closely enough to the plane of the fixed pointer 98 so that only a small amount or no play will exist before a post engages a button, and thus the sliding end gage can be returned in exact alignment with fixed pointer.

The operation of the ironworker will now be described. A workpiece W is placed on the rollers with its long edge abutting the front gaging surface of the bar 76 and its end abutting the finger 93 of the sliding end gage 81. At this time, the graduation aligned with the pointer 98 in the window 98 will be the common mark. The crank 72 is rotated to locate the workpiece in the Y axis. Next, the operator slides the workpiece along the X axis, watching the increasing graduations appearing in the window. When the desired graduation corresponding to the desired measurement aligns itself with the fixed pointer 98, the operator punches the workpiece. Subsequent locating of the workpiece may then continue. After the workpiece is removed, the sliding end gage is automatically returned to align the common mark graduation with the pointer 98.

As is readily apparent, the utilized turret-type ironworker and the unique gaging system are separately and in combination uniquely advantageous. It is also apparent that the preferred form of the apparatus illustrated and described is capable of modification without departing from the principles of the invention. Accordingly, the invention is not to be limited to the specific apparatus described, but is to be limited only by a literal interpretation of the claims appended hereto.

The embodiments of the invention in which an exclusive property or privilege is claimed are defined as follows:

1. An ironworker for punching, notching, shearing and like operations on structural members having extreme lengths and varied forms and shapes comprising a frame, a ram and striker mounted on said frame, a turret rotatably mounted on said frame and having a plurality of tools, including a punch and die, circumferentially spaced thereon and positionable selectively beneath said striker, means for supporting the structural member beneath said striker, means for locating said structural member along a first axis beneath the striker, and gaging means for locating the structural member along a second axis beneath the striker whereby accurate and rapid operations can be made on the structural member without manual measurements on the structural member.

2. The ironworker of claim 1, said gaging means including a sliding end gage engageable by the structural member for movement along said second axis, a pointer on said frame for indicating the location of the striker along said second axis, and elongated measuring means having measured graduations visible at said pointer and movable with said sliding end gage whereby movement of said sliding end gage by said structural member causes said graduations to pass said pointer for measuring the location of said structural member in said second axis.

3. The ironworker of claim 2, said gaging means including means biasing said sliding end gage into alignment with said pointer.

4. The ironworker of claim 3, said gaging means including guide means along said second axis, said sliding end gage having guide rollers mounted on said guide means for carrying the sliding end gage along said guide means, said elongated measuring means including a flexible tape coupled to said sliding end gage and automatically retractably mounted for movement along said second axis, said biasing means including a pair of elongated cords spring biased in opposite directions and each having an enlargement secured thereto, a pair of stops holding each enlargement against movement in said respective biased direction past the plane of the fixed pointer, and means on said sliding end gage selectively engageable with one of said enlargements for removing the enlargement from said respective stop to pull the cord against said spring bias so that the spring bias will return the sliding end gage to a neutral position aligned with the fixed pointer when the structural member is removed.

5. The ironworker of claim 4, said means for locating the structural member along said first axis including means for positioning the structural member supporting means along said first axis, said means for supporting the workpiece including a plurality of rollers rotatably mounted for rotation about axes parallel to said first axis, said means for positioning the supporting means along said first axis including an axle, crank means for rotating said axle, and means coupling the axle with said supporting means for movement along said first axis upon rotation of said axle.

6. The ironworker of claim 1, including a unitized mount integrally holding both said punch and said die and being removable from the turret as a single unit.

7. The ironworker of claim 5, including a unitized mount integrally holding both said punch and said die and being removable from the turret as a single unit.

8. The ironworker of claim 1, said means for locating the structural member along said first axis including means for moving the structural member supporting means along said first axis.

9. The ironworker of claim 8, said means for supporting the structural member including a plurality of rollers mounted for rotation about axes parallel to said first axis, said means for moving the supporting means along said first axis including an axle, crank means for rotating said axle, and means coupling the axle with said supporting means for movement along said first axis upon rotation of said shaft.

* * * * *